Figure 1:
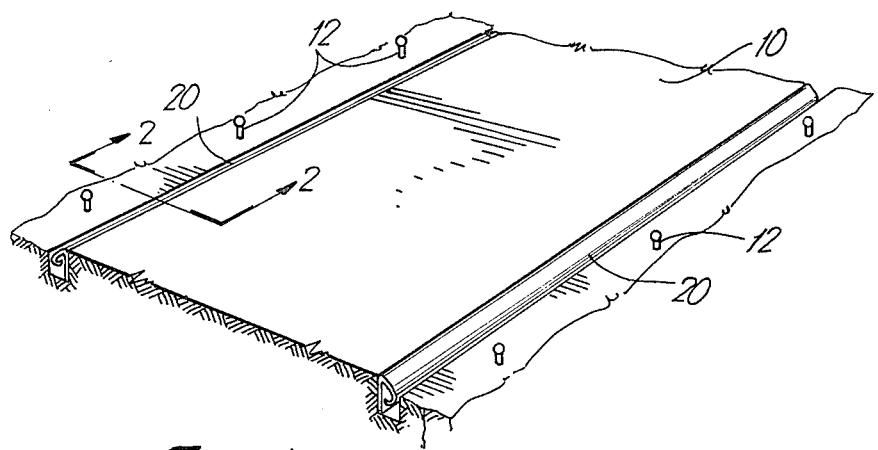

United States Patent [19]
Fancy

[11] 4,241,532
[45] Dec. 30, 1980

[54] WORM TRAP

[76] Inventor: Vincent S. Fancy, 372 Bay St., Ottawa, Ontario, Canada

[21] Appl. No.: 14,816

[22] Filed: Feb. 26, 1979

[51] Int. Cl.³ .............................................. A01M 1/22
[52] U.S. Cl. ...................................... 43/112; 43/121; 244/114 R
[58] Field of Search ..................... 43/98, 99, 112, 121; 244/114 R; 361/232; 256/10

[56] References Cited

U.S. PATENT DOCUMENTS

4,165,577  8/1979  Shanahan ............................. 43/99 X

FOREIGN PATENT DOCUMENTS

2448140  4/1976  Fed. Rep. of Germany ............. 43/112
2739165  12/1978 Fed. Rep. of Germany ............. 43/112
443773   2/1968  Switzerland ............................ 361/232
597751   4/1978  Switzerland ............................. 43/112

*Primary Examiner*—Nicholas P. Godici
*Attorney, Agent, or Firm*—Stanley E. Johnson; Richard J. Hicks

[57] ABSTRACT

An apparatus for improving flight safety in the vicinity of an airport by reducing the incidence of birds in the vicinity of the landing strip. Worm traps are disposed adjacent opposed marginal edges of the landing strip and extend longitudinally therealong and have an outer upper wall surface sloping downwardly and outwardly from the landing strip to the adjacent grassed area. The worm trap is located in a trench along the landing strip and a narrow strip between the worm trap and wall of the trench provides entry for the worms into the trench. The worm traps have an inner chamber for collecting the worms as they crawl there into through an opening adjacent the bottom of the worm trap. Means are provided within the chamber to electrocute the worms.

2 Claims, 2 Drawing Figures

U.S. Patent

Dec. 30, 1980

4,241,532

WORM TRAP

This invention relates to an apparatus for improving flight safety in the vicinity of an air field. More particularly, the invention is directed to reducing the incidence of birds in the vicinity of landing strips by substantially reducing a major portion of their food supply in that area.

The most hazardous portion of any flight is during landing and take-off and it is well known birds in the vicinity of the landing area contribute substantially to this hazard. Birds cannot only cause considerable structural damage to the aircraft in flight but also, when drawn to the intake of the jet motors, can cause motor malfunction at a most critical time.

Air fields seem a most desirable spot for birds to congregate and perhaps this is because of the vast open spaces which are devoid of other animals and predators of birds. The large areas of trimmed grass fields, with vast amounts of pavement draining water onto the grassed areas, provide an excellent breeding ground for dew worms. These worms provide an abundant supply of food and the birds are thus attracted to the area. It is well known, for many reasons, the worms at different times move from the grass fields onto the runways and thus the birds are frequently directly in the path of the aircraft. Worms which die on the landing strip attract thereto beetles and other insects which also bring the birds to feed on the landing strip.

It is a principal object of the present invention to eliminate as many of the worms as possible and thus, substantially reduce the birds supply of food, making an air field landing strip less attractive to the birds.

In accordance with the present invention, worm traps are located along longitudinal, marginal edges of the landing strip for collecting and eliminating the worms as they attempt to crawl onto the runway.

In accordance with a broad aspect of the present invention, there is provided a method of reducing the number of birds normally present in the vicinity of an aircraft landing strip and thereby enhance flight safety in that area comprising catching worms, that constitutes a major portion of the food supply for the birds in the selected area, by placing worm traps longitudinally along opposed marginal edges of the landing strip and preventing avian access to the worms that have been caught.

In accordance with another aspect of the present invention there is provided means for improving flight safety at an airport comprising an aircraft landing strip, and worm traps extending longitudinally along opposed marginal edges of the landing strip to collect worms as they attempt to crawl onto the surface of the landing strip.

Figure 2:
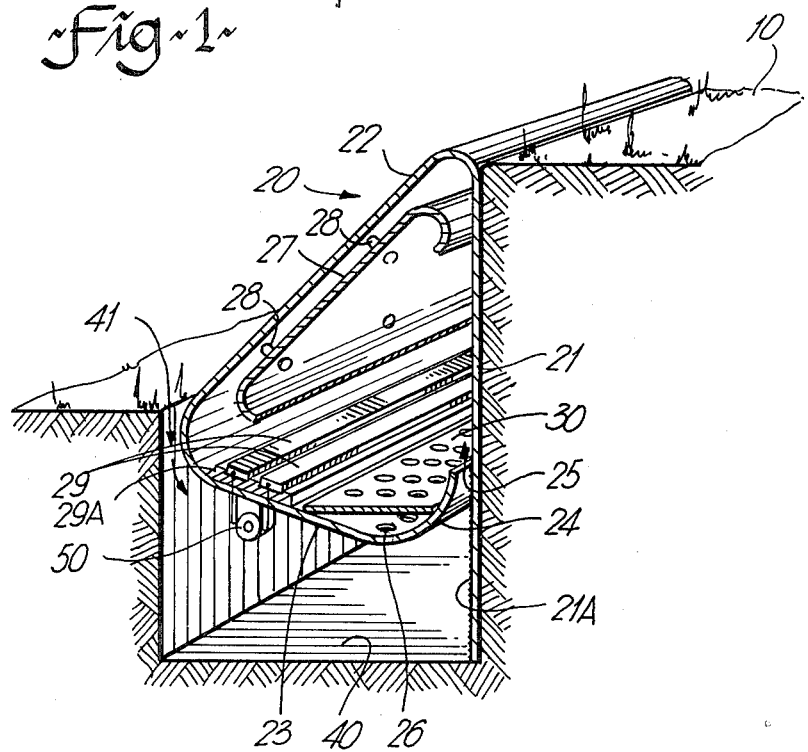

The invention is illustrated by way of example in the accompanying drawing, wherein:

FIG. 1 is an oblique view of an aircraft landing strip having worm traps provided in accordance with the present invention along opposite marginal edges thereof; and FIG. 2 is a cross-section taken along line 2—2 of FIG. 1.

Referring now to the drawings, there is illustrated in FIG. 1 a portion of an aircraft landing strip 10 with lines of marker lights 12 extending alongside thereof in a conventional arrangement. On each side of the landing strip 10 there is provided a longitudinally extending worm trap 20 to catch the worms as they attempt to crawl onto the top of the landing surface and thus denying food for birds that would be located in the path of an aircraft during landing or take-off. The worms are preferably killed and disintegrated shortly after being caught and this may be done electrically, mechanically and/or chemically. Alternatively, the worm traps may be provided with suitable door closed access openings so that the caught and live worms may be collected for use in other matters; i.e. fish bait.

Each trap 20 consists of a longitudinally extending metal casing having a vertical wall 21 which abuts against a side face of the landing strip and a top wall 22 which slopes downwardly away from the surface of the landing strip toward an entry opening 41 into a ditch or channel 40 in the earth. The top wall 22 merges into an inwardly and downwardly sloping lower wall 23 which in turn merges into an upwardly curved edge wall portion 24. The marginal edge of the upwardly curved wall 24 is spaced from the side wall 10 providing a gap or worm entry slot 25 into the interior of the casing.

The lower portion of the wall 24 is perforated as indicated at 26 for ventilation purposes. The upper wall 22 is reinforced by an inner wall 27 connected to the outer wall and held in spaced relationship therewith by a plurality of combined spacer and connector elements 28.

The sloped upper wall 22 and inner wall 27 are preferably relatively short in length (in a direction transverse to the length of the landing strip) and have sufficient strength to support wheeled vehicles commonly used in maintenance of air fields.

In the lower portion of the chamber of the trap there is provided a perforated metal floor 30 facilitating decomposition of the collected worms which preferably are electrocuted and fried to a crisp by electrical bus bars 29 connected to a suitable high voltage source. The voltage source is diagrammatically illustrated in FIG. 2 and identified by the reference numeral 50. The bus bars 29 are insulated from the casing and one another by an insulating pad 29A and, if desired, the bus bars may be part of an electrical distribution system for powering the guidance lights 12.

Worms attempting to crawl from the grassed area onto the surface of the landing strip fall into the ditch 40 through the gap 41 which extends longitudinally and parallel to the landing strip. Once in the ditch the worms attempt to crawl out and to facilitate doing so the surface of wall 21 is roughed as indicated at 21A by, for example, sandblasting. Also, the distance from the bottom 42 of the ditch to the gap 25 is substantially less than to the gap 41 so as to direct the worms escape route from the ditch 40 through the entry gap 25 into the interior of the casing. Worms that continue to climb wall 21 crawl between the sloped walls 22 and 27 falling eventually onto the bus bars 29. Others entering the interior of the casing will eventually contact the bus bars and be electrocuted while attempting to find an escape route. It might also be mentioned, the casing wall 22 sloping downwardly from the runway surface to the gap 41 has the effect of directing the worms into the gap 41 because of the latter being a path of least resistance. If desired the slope of wall 22 and/or smoothness of the outer exposed surface thereof may be such as make it difficult, if not impossible, for worms to crawl thereon. The inner wall 27 serves not only as a stiffening member but also (in the space between such wall and outer wall 22) provides a path sloping toward the bus bars, terminating at a suitable position to ensure that the worms will drop onto the electrodes. Opposite ends of the worm traps are closed by open mesh screens 32 that prevent birds and/or rodents from getting into the worm traps.

I claim:

1. An arrangement intended to reduce the number of birds normally present in the vicinity of an airport and thereby improve flight safety in that region and wherein the airport has at least one aircraft landing strip comprising: longitudinally extending trenches in the earth along each of opposed marginal edges of the landing strip and worm traps located in said trenches, said worm traps extending longitudinally along said trenches at a position spaced upwardly from a bottom wall of the trench, said worm traps having a vertical wall abutting a marginal edge of the landing strip, an entry adjacent said vertical wall to a chamber in the worm trap, said entry being located in the trench and extending longitudinally therealong at an elevation lower than the surface of the landing strip, and a longitudinal edge opposite and parallel to said vertical wall, said latter longitudinal edge being spaced from a vertical wall of the trench remote from the marginal edge of the landing strip providing an open unrestricted path for worms to crawl into the trench.

2. An arrangement as defined in claim 1 wherein said worm traps are essentially triangular in cross-sectional shape and wherein an upper wall thereof slopes downwardly and away from the surface of the landing strip toward a vertical wall of the trench.

* * * * *